Oct. 18, 1932.　　　F. A. SMITH　　　1,883,032

SPARE WHEEL CARRIER AND LOCK

Filed July 2, 1931　　　2 Sheets-Sheet 2

Inventor
Frederick A. Smith.
by Charles Hill
Attys.

Patented Oct. 18, 1932

1,883,032

UNITED STATES PATENT OFFICE

FREDERICK A. SMITH, OF NORTH CHICAGO, ILLINOIS, ASSIGNOR TO OAKES PRODUCTS CORPORATION, OF NORTH CHICAGO, ILLINOIS, A CORPORATION OF MICHIGAN

SPARE WHEEL CARRIER AND LOCK

Application filed July 2, 1931. Serial No. 548,398.

This invention relates to spare wheel carrier and lock structure particularly adaptable for supporting wire wheels and locking them thereto against theft.

An important object of the invention is to provide a support for receiving the hub of a wheel, together with latch members operating automatically to lock the wheel to the support, and a lock for retaining the latch members in latching or locking condition after application of a wheel to the support.

A further object is to provide latch members which are spring actuated to be normally withdrawn from the path of a wheel when applied to the support but which are eventually engaged by the wheel to be moved into locking position, together with a lock operated cam member for holding the latch members in locking position and to prevent release thereof only by the insertion and turning of a proper key in the lock mechanism.

A further object is to provide a simple, economically manufactured and efficient carrier and lock assembly for wire wheels.

The above enumerated and other features of my invention are incorporated in the structure disclosed on the drawings, in which drawings.

Figure 1:
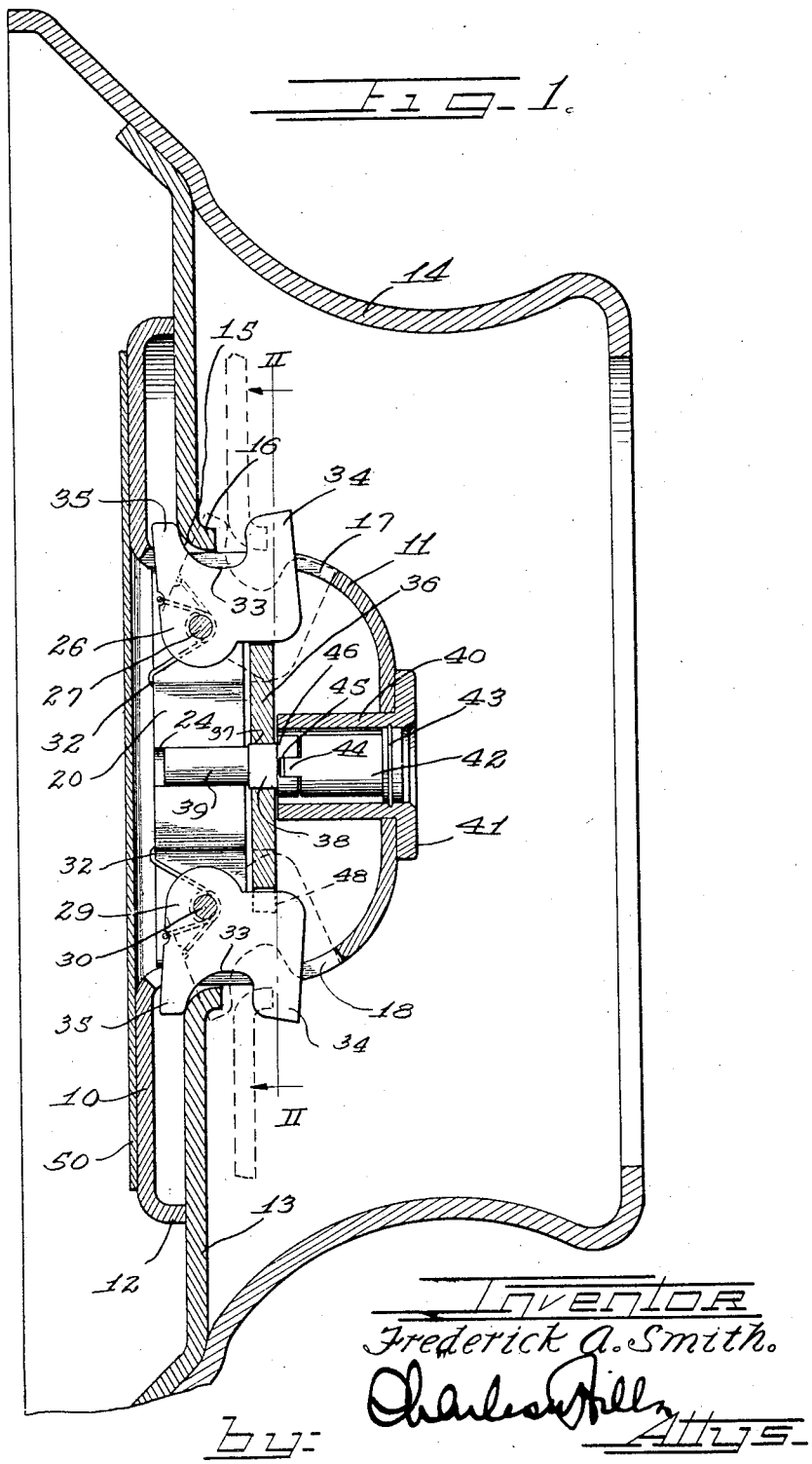
Figure 1 is a vertical diametral section of a carrier structure and the hub of a wire wheel applied thereto.

The carrier structure shown comprises a circular disc 10 which may be of sheet metal and which is centrally deflected frontwardly to form the head or boss 11 of circular cross section. The disc 10 may be supported in any suitable manner from the body of a vehicle at any desired location thereon, and the disc has the frontwardly extending peripheral flange 12 forming a seat for the inner cross wall 13 of the hub structure 14 of a wire wheel. The cross wall 13 has the central opening 15 surrounded by the frontwardly extending flange 16, the diameter of the opening being such that the opening may receive the head 11 on the carrier disc 10, the front end of the head being rounded or convex as shown so that the wheel may be more readily applied thereto.

The head 11 has oppositely disposed slots 17 and 18 extending frontwardly from the disc 10, and extending diametrally in the head between the slots is a frame constructed of sheet metal side plates 19 and 20 deflected laterally at their ends to form flanges 21 by means of which the frame may be rigidly secured to the inner side of the head 11 as by welding, riveting, or otherwise. Midway between their ends the plates of the frame have respectively the semi-circular deflections 22 and 23 forming a cylindrical bearing channel 24 which is coaxial with the head 11. Adjacent to the bearing deflection, the plates are in contact for a distance as indicated in Figure 2 and may be welded or riveted together at that point. At their outer ends the plates are separated to leave channels 24 and 25 respectively which are in alignment with the slots 17 and 18 in the head 11. Within the channel 24 a pawl or latch member 26 is pivoted on a pin 27 extending through and supported by the adjacent separated ends of the frame plates 22 and 23, and the pivot pin may be held in place by a cotter pin 28. Within the channel 25 is a similar pawl or latch member 29 pivoted on a pin 30 locked in place by a cotter pin 31. The pawl or latch members are of generally rectangular shape and are supported by the pivot pins near their inner rear corners as clearly shown in Figure 1. A spring 32 is provided for each latch member, the spring being coiled about the pin with one end thereof engaging against the rear edge of the respective latch member and the other end of the spring being anchored to the side plates 22 and 23 of the latch member supporting frame, the springs tending to yieldingly swing the front ends of the latch members inwardly within the slots 17 and 18 respectively. In its outer edge each latch member has the recess or notch 33 leaving the front and rear abutment ends 34 and 35, the bottoms of the recesses 33 being below the outer surface of the head 11.

When the pawl or latch members are free, their springs 32 will swing them radially inwardly to withdraw their front ends 34 below the outer surface of the head 11 and against the front edges of the slots 17 and 18 respectively, as indicated in dotted lines in Figure 1. In this position of the latch members, their rear ends 35 project a distance through the slots beyond the outer face of the head 11 to be in the path of the flange 16 on the hub wall 13 when the wheel is applied to the head, and as the hub is moved rearwardly to abut against the flange 12 of the disc 10 the pawl or latch members are swung rearwardly and their front ends 34 are projected outwardly through the slots 17 and 18 respectively to be in front of the flange 16.

To hold and lock the latch members in their hub locking position, a cam disc 36 is provided which is of substantially elliptical or ovate shape. The cam disc has the central polygonal opening 37 for receiving the polygonal neck 38 on the bearing stud 39 which extends into and has bearing in the bearing channel 24 formed by the latch member supporting frame. Extending axially into the frame 11 is a cylindrical sleeve or housing 40 secured by its outer flange 41 against the outside of the head. A lock cylinder 42 is rotatable within the housing and is locked against axial movement by an annular key 43. At its inner end the lock cylinder has a tongue 44 engaging in the groove 45 formed in the head 46 on the bearing stud 39, so that when the lock cylinder is turned by means of a key the stud and the cam disc thereon will be rotated.

The cam disc engages with the latch members substantially radially inwardly of their front ends 34, and when the major axis of the cam disc is in alignment with the latch members, the latch members will be held in their outwardly swung position with their ends 34 projected to be in front of the wall 13 to prevent removal of the wheel from the carrier. When the cam is turned with its minor axis in alignment with the latch members the springs will swing the latch members inwardly to withdraw their ends 34 from the path of the hub wall 13 so that the wheel may be removed. In order to properly align the cam disc relative to the latch members, it has an abutment wing 47 providing the abutment shoulders 48 and 49 spaced substantially ninety degrees apart, the shoulder 48 abutting against the side of the lower latch member 29 when the major axis of the cam disc is in alignment with the latch members, as indicated in Figures 1 and 2, and the shoulder 49 abutting against the side of the upper latch member when the cam disc minor axis is in alignment with the latch members, as indicated by dotted lines in Figure 2. The abutment shoulders thus define the limits of rotation of the cam disc for the proper setting of the latch members.

To close the rear end of the head 11 in order to prevent unlawful access to the lock parts, a plate 50 is secured against the back of the carrier disc 10.

Figure 2:
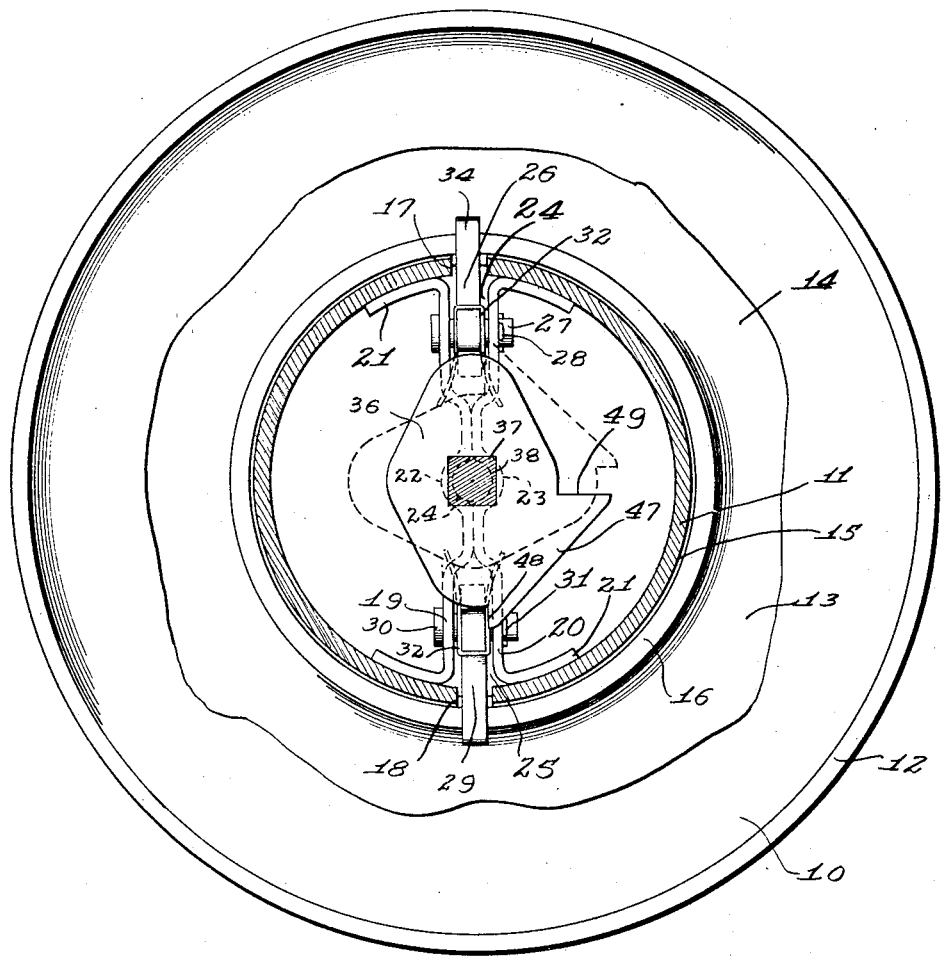
Figure 2 is a section on plane II—II of Figure 1.

Briefly repeating the operation of the structure, the latch members are normally held retracted inwardly as shown by the dotted lines in Figure 1, and the inner wall 13 of the hub of the wheel to be carried is shifted onto the head 11 until it abuts against the flange 12 of the disc 10. During its passage along the head the rounded edge of the opening 15 encounters the rear ends or projections 35 of the latch members and the latch members are swung with their front ends 34 outwardly to project these ends through the slots 17 and 18 respectively and into position in front of the flange 16. The lock which was normally in position with the cam minor axis in alignment with the latch members is now turned by a suitable key to rotate the cam disc to bring its major axis into alignment with the latch members, and the cam disc is then in position with its ends directly below the inner edges of the latch members and locks the members in their extended position so that the wheel cannot be removed. When the wheel is to be removed, the lock is turned by the key to rotate the cam disc 190 degrees so that the springs 32 may retract the latch members in advance of the wall 13 as the wheel is withdrawn from the head 11. It is evident that the rear ends or projections 35 of the latch members may be omitted and the latch members swung outwardly into locking position by the turning of the cam disc with the lock after the wheel has been applied to the carrier. This arrangement will of course require more effort to turn the lock against the resistance of the latch member springs, but by providing the ends 35 the pressure of the wheel when applied to the carrier will swing out the latch members so that the lock can be turned to rotate the cam disc into locking position with very little effort and without straining the lock.

My improved carrier and locking structure is of simple and durable construction, the parts being substantially all made from sheet metal by means of simple dies, so that the structure can be very economically manufactured.

I do not desire to be limited to the exact construction and arrangement shown as changes and modifications may be made without departing from the scope of the invention as defined by the appended claims.

I claim as follows:

1. In a spare wheel lock structure, the combination of a supporting member for receiving the hub of a spare wheel, latch members pivotally mounted on said supporting member, means tending to yieldingly hold said latch members in unlatching position, and a lock controlled cam member for engaging with and holding said latch members in latching position.

2. In spare wheel carrier and lock mechanism, the combination with a support having a head thereon for receiving the apertured wall of the hub of a wheel to be carried, latch members pivoted within said head to be swung to project their ends to the exterior of the head to locking position in front of a hub wall mounted on the head, springs tending to swing said latch members to unlocking position, a cam disc within said head adapted in one position to permit said springs to swing said latch members to unlocking position and adapted in another position to engage with said latch members to swing them into locking position, means for turning said cam disc, and abutments on said cam disc defining the limits of movement thereof.

3. In spare wheel carrier and lock mechanism, the combination with a support having a head thereon for receiving the apertured wall of the hub of a wheel to be carried, latch members pivoted within said head to be swung to project their ends to the exterior of the head to locking position in front of a hub wall mounted on the head, springs tending to swing said latch members inwardly, a cam disc within said head adapted in one position to permit said springs to swing said latch members to unlocking position and adapted in another position to engage with said latch members to swing them into locking position, means for turning said cam disc, and abutments on said cam disc for abutting against said latch members to define the limits of rotation of said cam disc.

4. In a spare wheel carrier and lock structure, the combination of a sheet metal supporting member having a head deflected therefrom for receiving the apertured wall of the hub of a wheel to be carried, said head having slots therein, a frame formed of sheet metal sides extending diametrally through said head between said slots with said sides spaced apart at their ends to form channels in alignment with said slots, latch members pivoted in said channels to swing radially and having ends for projection through said slots to be in front of and to prevent removal of a wheel hub applied to the head, springs tending to swing said latch members to unlocking position, said frame sides being deflected to form a bearing passage, a stud journalled in said passage, a cam disc mounted on said stud between said latch members, said cam disc in one position permitting inward swing of said latch members by their springs to unlocking position, and in another position engaging said latch members to hold them in extended position for locking a wheel to the head, a key operated lock mounted in said head and connected with said stud for turning said cam disc to control said latch members.

5. In a spare wheel carrier and locking structure, the combination of a supporting member for receiving the hub of a spare wheel to be supported, latch members pivoted in said supporting member and having front and rear projections, means normally yieldingly holding said latch members swung in locking position with their front projections displaced from the path of an applied wheel hub but with their rear projections in the path of the wheel hub, and means whereby when said rear projections are engaged by a wheel hub said latch members are swung to position their front projections in locking position in front of the applied wheel hub to prevent removal of the wheel from said support, and lock controlled means for locking said latch members in such locking position.

6. In spare wheel carrier and lock structure, the combination of a supporting member having a head thereon for receiving the hub of a wheel to be carried, latch members pivoted in said head, said head having slots and said latch members having front and rear projections for extending through said slots, springs tending to swing said latch members to unlocking position to withdraw their front projections from the path of a wheel hub applied to the head but to hold their rear projections in the path of the hub, and means whereby the engagement of a wheel hub with said rear projections will swing said latch members to bring their front projections into locking position in front of the wheel hub to thereby prevent removal of the wheel from the carrier, a cam member between said latch members, and a lock for rotating said cam member to lock said latch members in locking position.

7. In a spare wheel lock structure, the combination of a supporting member for receiving a spare wheel, a latch member pivotally mounted on said supporting member and normally held in unlocking position, and means controlled by the application of a wheel to the carrier to rotate said latch member to locking position, and means for locking said latch member in locking position.

8. In a spare wheel lock structure, the combination of a supporting member for receiving the hub of a wheel to be locked, a latch member on said supporting member, means normally holding said latch member in unlocking position, means controlled by the application of a wheel hub to said supporting member for positively moving said latch member to locking position, and lock means for locking said latch member in locking position.

9. In a spare wheel lock structure, the combination of a supporting member for receiving the hub of a wheel to be locked, a latch member pivotally mounted on said supporting member, means normally holding said latch member in unlocking position, an abutment on said latch member adapted to be engaged by an applied wheel to rotate said latch member to locking position, and means for locking said latch member in locking position.

10. In a spare wheel lock structure, the combination of a supporting member for receiving the hub of a spare wheel, latch members pivotally mounted on said supporting member, yielding means normally holding said latch members in unlocking position, abutments on said latch members adapted to be engaged by an applied wheel to swing said latch members to locking position, and a key controlled locking member for locking said latch members in locking position.

In testimony whereof I have hereunto subscribed my name at North Chicago, Lake County, Illinois.

FREDERICK A. SMITH.